(12) United States Patent (10) Patent No.: US 7,949,867 B2
Deshpande et al. (45) Date of Patent: *May 24, 2011

(54) SECURE COMMUNICATIONS

(75) Inventors: Sanjay Deshpande, Pune (IN);
Ganapathy Nanjundeshwar, Pune (IN);
Pat Sankar, Tustin, CA (US)

(73) Assignee: REL-ID Technologies, Inc., Irvine, CA (US)

( * ) Notice: Subject to any disclaimer, the term of this patent is extended or adjusted under 35 U.S.C. 154(b) by 840 days.

This patent is subject to a terminal disclaimer.

(21) Appl. No.: 11/611,047

(22) Filed: Dec. 14, 2006

(65) Prior Publication Data

US 2008/0022091 A1 Jan. 24, 2008

Related U.S. Application Data

(60) Provisional application No. 60/807,804, filed on Jul. 19, 2006.

(51) Int. Cl.
*H04L 9/00* (2006.01)
(52) U.S. Cl. ........ 713/150; 713/157; 713/161; 713/168; 713/169; 713/171; 726/2; 726/3; 726/4; 726/5; 380/277; 380/285
(58) Field of Classification Search .................. 713/150, 713/157, 161, 168, 169, 171; 726/2–5; 380/277, 380/285
See application file for complete search history.

(56) References Cited

U.S. PATENT DOCUMENTS

| | | | |
|---|---|---|---|
| 3,962,539 A | 6/1976 | Ehrsam | |
| 4,200,770 A | 4/1980 | Hellman | |
| 4,405,829 A | 9/1983 | Rivest | |
| 4,408,203 A | 10/1983 | Campbell | |
| 4,424,414 A | 1/1984 | Hellman | |
| 4,734,564 A | 3/1988 | Boston | |
| 4,797,920 A | 1/1989 | Stein | |
| 4,823,388 A | 4/1989 | Mizutani | |
| 4,825,050 A | 4/1989 | Griffith | |
| 4,868,877 A | 9/1989 | Fischer | |
| 4,885,788 A | 12/1989 | Takaragi | |
| 5,018,196 A | 5/1991 | Takaragi | |
| 5,973,731 A | 10/1999 | Schwab | |
| 5,991,408 A | 11/1999 | Pearson | |
| 6,105,010 A | 8/2000 | Musgrave | |
| 6,697,947 B1 | 2/2004 | Matyas, Jr. | |
| 6,844,660 B2 | 1/2005 | Scott | |
| 6,847,816 B1 | 1/2005 | Sarradin | |
| 6,850,147 B2 | 2/2005 | Prokoski | |

(Continued)

OTHER PUBLICATIONS

Sklira et al. "A Framework for the design of Bank Communications Systems". pp. 1-22, 2003. http://www.sciencedirect.com/science?_ob=ArticleURL&_udi=B6TYP-47YXW9F-3&_user=2502287&_coverDate=09%2F22%2F2003&_rdoc=1&_fmt=high&_orig=search&_sort=d&_docanchor=&view=c&_searchStrId=1222805417&_rerunOrigin=google&_acct=C000055109&_version=1&_urlVersion=0.*

(Continued)

*Primary Examiner* — Nasser Moazzami
*Assistant Examiner* — Lisa Lewis
(74) *Attorney, Agent, or Firm* — SoCal IP Law Group LLP; Steven C. Sereboff; M. Kala Sarvaiya

(57) ABSTRACT

There are disclosed processes and systems for establishing secure, communication channels between computing devices. The computing devices include respective agents which verify the relative identity of one another and thereby authenticate the communication channel. The agents continue to play a role in the communications to ensure that the communication channel is secure.

10 Claims, 4 Drawing Sheets

U.S. PATENT DOCUMENTS

| | | |
|---|---|---|
| 6,851,051 B1 | 2/2005 | Bolle |
| 6,871,287 B1 | 3/2005 | Ellingson |
| 6,915,430 B2 | 7/2005 | Wheeler |
| 6,920,561 B1 | 7/2005 | Gould |
| 6,928,546 B1 | 8/2005 | Nanavati |
| 6,941,285 B2 | 9/2005 | Sarcanin |
| 6,959,336 B2 | 10/2005 | Moreh |
| 6,959,381 B2 | 10/2005 | Wheeler |
| 6,978,369 B2 | 12/2005 | Wheeler |
| 6,983,368 B2 | 1/2006 | Wheeler |
| 6,990,586 B1 | 1/2006 | Tresser |
| 6,991,174 B2 | 1/2006 | Zuili |
| 7,010,691 B2 | 3/2006 | Wheeler |
| 7,013,030 B2 | 3/2006 | Wong |
| 7,031,657 B2 | 4/2006 | Tehrani |
| 7,035,443 B2 | 4/2006 | Wong |
| 7,047,414 B2 | 5/2006 | Wheeler |

OTHER PUBLICATIONS

RSA Laboratories, "What is Diffie Hellman?", pp. 1-2, retrieved from Internet on Feb. 25, 2010. http://rsa.com/rsalabs/node.asp?id=2248.*

"Introduction to Secure Sockets Layer/Private Key Infrastructure", pp. 1-5, 2002 (Internet Archive Wayback Machine). http://web.archive.org/web/20020607112636/http://www.tldp.org/HOWTO/SSL-RedHat-HOWTO-2.html.*

Ellison & Schneir, Ten Risks of PKI: What You're not Being Told about Public Key Infrastructure, Computer Society Journal, vol. XVI, No. 1, 2000.

* cited by examiner

SECURE COMMUNICATIONS

RELATED APPLICATION INFORMATION

This patent claims priority from and incorporates by reference Application No. 60/807,804 filed Jul. 19, 2006.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to secured communications.

2. Description Of The Related Art

Traditionally, identity of an entity has been defined through one or more absolute labels or collections of properties of the entity. An entity is something that has objective or physical reality and distinctness of being and character. An entity has independent or separate existence from other like entities, and has a unitary and self-contained character. An entity may be a human, an animate or inanimate object, a machine or a process, and may be just one of these or a group of like or unlike entities.

Identity of an entity is typically defined in terms of a) what the entity possesses, b) what the entity knows, and c) what the entity is. Any one who can steal or possess these attributes can for all practical purposes assume the identity of the original entity. Identity can be defined by persistent qualities (e.g., a human fingerprint) and by transitory qualities (e.g., a human's current location).

Absolute and relative identity principles may be used to define an entity's identity. An individual's identity is absolute if it is defined independently of all other like entities. For example, a human's absolute identity may be defined by their name, their social security number, or their passport number. In contrast, an entity's is relative if it is defined based upon the entity's relationship with some other individual or individuals. For example, a human's relative identity may be defined by their relationship as father or mother of a particular other person, as an employee of a particular company, or a friend of some other person. As can be seen, one or more aspects of an individual's identity may or may not be unique.

An entity's interaction with other entities is based on mutual trust which is specific to that particular relationship. Historically, authentication between two individuals meant that the two individuals knew each others identity based on a previously established trust. As a result of the established trust, these two individuals would allow each other to send and receive information between each other.

While effective communications are based upon trust, modern digital communications have faced problems with identity theft. Identity theft as originally limited to theft of individuals' identities. However organizations, such as financial organizations, government agencies, military infrastructures, hospitals and educational institutions, are now also seeing their identities misappropriated.

Digital identity theft can happen surreptitiously under the stealthiest of circumstances. Organized identity theft can peel off layer after layer of the trusted identities of a typical computing environment and surroundings without the slightest warning or suspicion. With more personal data being stored electronically, many safeguards have been implemented or proposed. Yet, while these defenses have cut down on some types of fraud, they generally do nothing or fail effectively to protect against identity theft.

Advanced security solutions such as public keys, digital certificates and centralized certificate authorities have been used to provide environments of trusted identity. There have been systematic evolutionary changes in identity management over the years, through the discovery of cryptography, Shannon's theorem on perfect secrecy, the RSA algorithm, firewalls, intrusion detection systems, VPNs, CAs, the Public Key Infrastructure and the use of biometrics, amongst other things. There have also been efforts to expose the serious weaknesses of the current security infrastructure solutions by Dick Hardt of Sxip, Kim Cameron of Microsoft, Bob Blakely of IBM and Kaliya Hamlin. They proposed user centric approaches as opposed to the currently practiced certificate authority centric approaches.

DETAILED DESCRIPTION

Throughout this description, the embodiments and examples shown should be considered as exemplars, rather than limitations on the apparatus and methods disclosed or claimed.

Description of Apparatus

Figure 1:
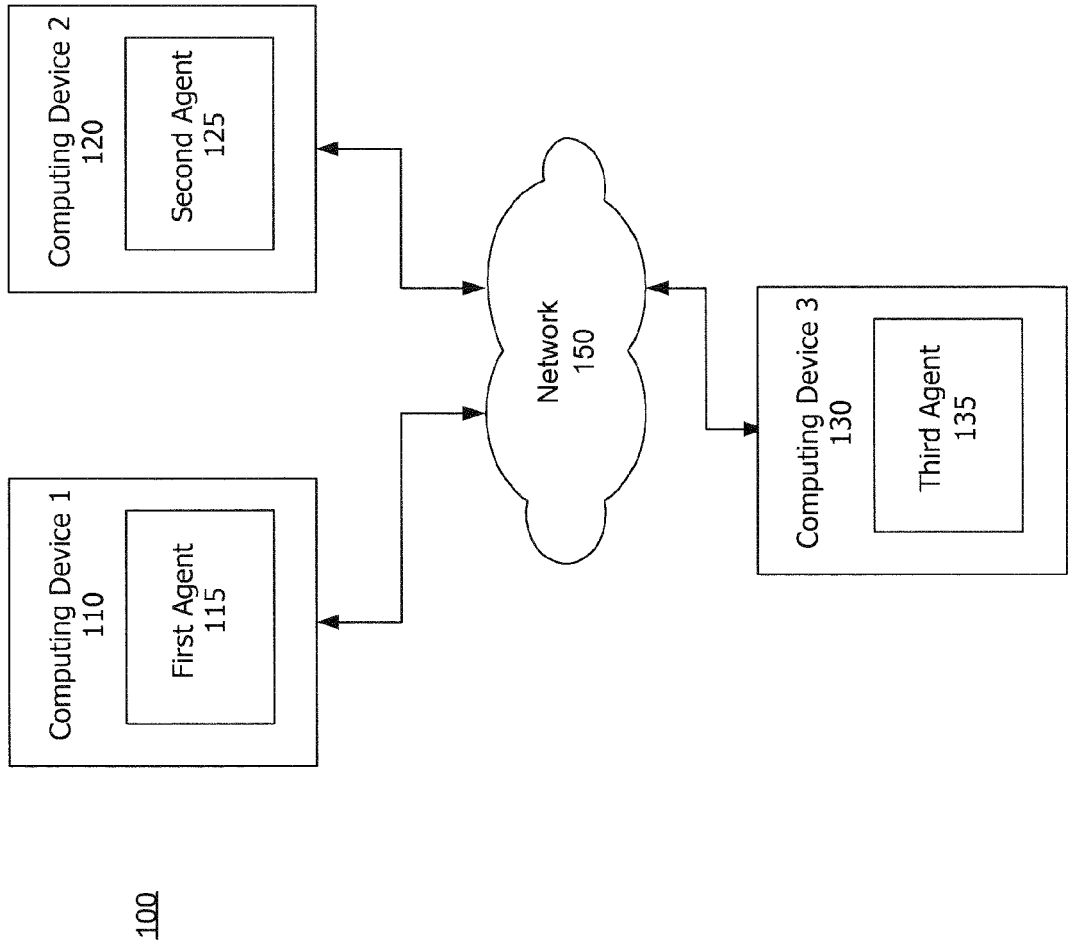
FIG. 1 is a block diagram of a system in which secure trustworthy two-way cation channels may be established and used.

Referring now to FIG. 1 there is shown a block diagram of a system 100 in which trusted two-way authenticated communication channels may be established and used. The system 100 includes three computing devices 110, 120, 130 connected to a network 150. Although the system 100 has been shown with three computing devices, a scalable solution is described herein that can comprise additional computing devices.

The computing devices 110, 120, 130 are representative of a class of computing devices which may be any device with a processing unit and memory that may execute instructions. Computing devices may be personal computers, server computers, computing tablets, set top boxes, video game systems, personal video recorders, telephones, personal digital assistants (PDAs), portable computers, laptop computers, fax machines, cell phones and special purpose devices. Computing devices have processor and memory. These computing devices may run an operating system, including, for example, variations of the Linux, Unix, MS-DOS, Microsoft Windows, Palm OS, and Apple Mac OS X operating systems.

The network 150 provides a platform for communications between the computing devices 110, 120, 130. The network 150 may be or include local-area networks (LANs), wide-area networks (WANs), metropolitan-area networks (MANs), distributed networks and other similar networks in which computing devices may be linked together. The network 130 may provide lower layer network support for computing devices to interact with one another. The network 130 may be packet-switched and may comprise a common or private bi-directional network, and may be, for example the Internet. The network 150 may be wired or wireless. In addition, the network 130 may be configured based on client-server architecture, a peer-to-peer architecture, or any other distributed computing system architecture. Further, the network 130 may be configured to comprise additional components so as to ensure a scalable solution.

The computing devices 110, 120, 130 may include respective agents 115, 125, 135. The agents 115, 125, 135 may be securely bound to their respective computing devices 110, 120, 130. Alternatively, the agents 115, 125, 135 may be portable and installable on different computing devices at a user's discretion. For example, an agent or critical components thereof may be stored on a device such as a smart card or portable flash memory device, and a user may carry the smart card or portable flash memory device for use with various computing devices.

The agents of FIG. 1 are a first agent 115, a second agent 125, and a third agent 135. Although respectively shown with a single agent 115, 125, 135, the computing devices 110, 120, 130 may each have more than one agent. As explained below, the agents 115, 125, 135 may have identities relative one another. The agents 115, 125, 135 may authenticate communication channels between the communications devices, and may provide security for communications on the authenticated channels.

As used herein, an agent may be or include a software module or application which may be loaded and run on a computing device. An agent may communicate with other functional units within the corresponding computing device. An agent may also communicate with agents remote to the communications device. One function of an agent is to store certain encrypted data so as to prevent the encrypted data from being accessible (e.g., viewed) by other functional units within the computing device (e.g., applications in user space). Access may be considered restricted if the agent has exclusive access or substantially exclusive access to the tools needed to decrypt the packets, such as decryption keys and software. Access may also be considered restricted if the agent has exclusive access or substantially exclusive access to the encrypted data itself.

Encrypted data is data which has been obscured to make it unreadable and unidentifiable at some level of confidence. Data which has been encrypted can be decrypted using a corresponding method or algorithm which may correspond to the method or algorithm used to encrypt the data. This data may be or may be representative of, for example, numbers, characters, audio, images, voice and video.

The relative identity of one agent to another agent may be based on information which is unique for the relationship between the two agents. The relative identity also may be based on information which is only known to the two agents in the particular relationship. With multiple computing devices 110, 120, 130 and multiple agents 115, 125, 135, there may be multiple separate relative identities in the system 100. Thus, the first user agent has an identity relative to the second user agent and a different identity relative to the third agent. Likewise, the second user agent has an identity relative to the first user agent and a different identity relative to the third agent. Finally, the third user agent has an identity relative to the first user agent and a different identity relative to the second agent. All six of these relative identities may be distinct. In short, a relative identity uniquely identifies one particular agent's relationship to another particular agent.

Even between two agents, there may be multiple unique relative identities arising from multiple relationships between the two agents. For example, an individual may have a checking account and a savings account with the same bank. Those two accounts will have a separate account numbers. Likewise, the multiple relative identities created for two particular agents could identify the separate relationships the two agents have with each other.

Additional and fewer units, modules or other arrangement of software, hardware and data structures may be used to achieve the processes and apparatuses described herein.

Description of Processes

Figure 2:
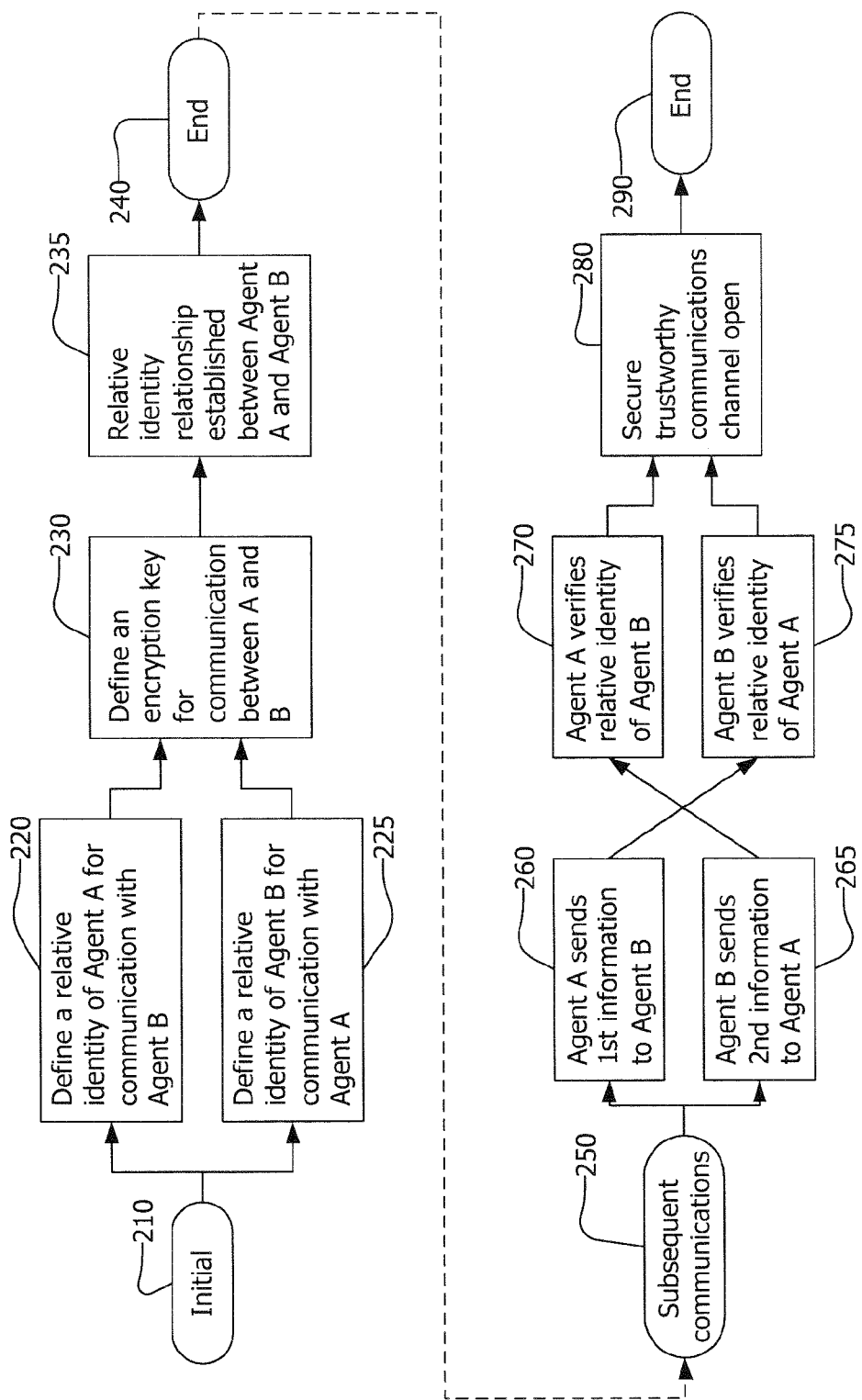
FIG. 2 is a flow chart of a process of establishing a secure trustworthy two-way cation channel between two agents.

Referring now to FIG. 2, there is shown a flow chart of an exemplary process of establishing a communication channel between two computing devices. The description of the process is made with respect to a first agent, termed agent A, hosted by a first computing device and a second agent, termed agent B, hosted by a second computing device. These agents may be, for example, the agents 115, 125, 135 in the system 100 of FIG. 1.

The process for establishing a communication channel between agent A and agent B is compose of two parts. The first part, from 210 to 240, establishes a relative identity relationship between agent A and agent B. A relative identity relationship means that agent A has a relative identity with respect to agent B and agent B has a relative identity with respect to agent A. Both agent A and agent B are aware of the existence of the relative identity relationship, but neither knows the relative identity of the other. The second part of the process, from 250 to 290, each agent verifies the identity of the other before opening a secure trustworthy communication channel between agent A and agent B.

Either agent A or agent B may initiate the process to establish a relative identity relationship at 210. At 220, agent A defines its relative identity with respect to agent B. The relative identity of agent A may be obtained from a third party (not shown in FIG. 2), may be derived from information about the relationship between agent A and agent B, or may simply be randomly selected by agent A. Similarly, at 225, agent B defines its relative identity with respect to agent A. The relative identity of agent B may be also obtained from a third party, may be derived from information about the relationship between agent A and agent B, or may simply be randomly selected by agent B. Agent A and agent B may not disclose their relative identities to each other.

Either agent A or agent B may initiate subsequent communication at 250. At 260, agent A may send first information to agent B. The first information may be derived from the relative identity of agent A in a manner that allows agent B to verify the identity of agent A without disclosing the relative identity of agent A. The first information may be derived from the relative identity of agent A and other data known to both agent A and agent B.

Similarly, at 265, agent B sends second information to agent A. The second information may be derived from the relative identity of agent B in a manner that allows agent A to verify the identity of agent B without disclosing the relative identity of agent B. The second information may be derived from the relative identity of agent B and other data known to both agent A and agent B.

The first and second information may be derived in numerous ways including using various algorithms well-known in the art of cryptography. For example, the first and second information can be generated by using one-way hash functions, modulus functions, cyclic arithmetic operations, and various other algorithms.

It should be recognized that the first and second information of this example may be distinct from each other. Additionally, both the first and second information are derived, in part, from the relative identities of agents A and B and are thus unique to the relationship between these two agents. While both the first and second information are derived, in part, from the relative identities of the agents A and B, respectively, the relative identities cannot be determined from the first and second information.

At 270, agent A uses the second information received from agent B to verify the identity of agent B. Similarly, at 275, agent B uses the first information received from agent A to verify the identity of agent A. A secure trustworthy communications channel is opened between agents A and B at 280 only if both agent A and B successfully verify the identity of the other agent. The process from 250 to 290 may be repeated for every communication session between agent A and agent B, or may be repeated only if secure trustworthy communications are desired between agents A and B.

Communications between agents A and B, including communications required to verify their relative identities, may be encrypted using an encryption key. The encryption key may optionally be a unique key which may be defined at 230.

The communication channel that is established at 280 may be described as a secure communication channel because the identity information of either agent cannot be stolen. The identity information of an agent cannot be stolen because the identity information is not transmitted, provided or released from the agent over the network. As such, the identity of the agent is protected and is not compromised. As a result, fraudulent transactions based on using an agent's identity information are prevented since an agent's identity information cannot be obtained by an unauthorized entity.

The communication channel that is established at 280 may also be trustworthy. A trustworthy communication channel is a channel which is established between authorized entities. The communication channel of 280 is trustworthy since each agent has verified the identity of the other agent. The trust that is established and verified between the agents is based on the first and second information exchanged between the agents which, in turn, is derived from the relative identity of each agent.

Figure 3:
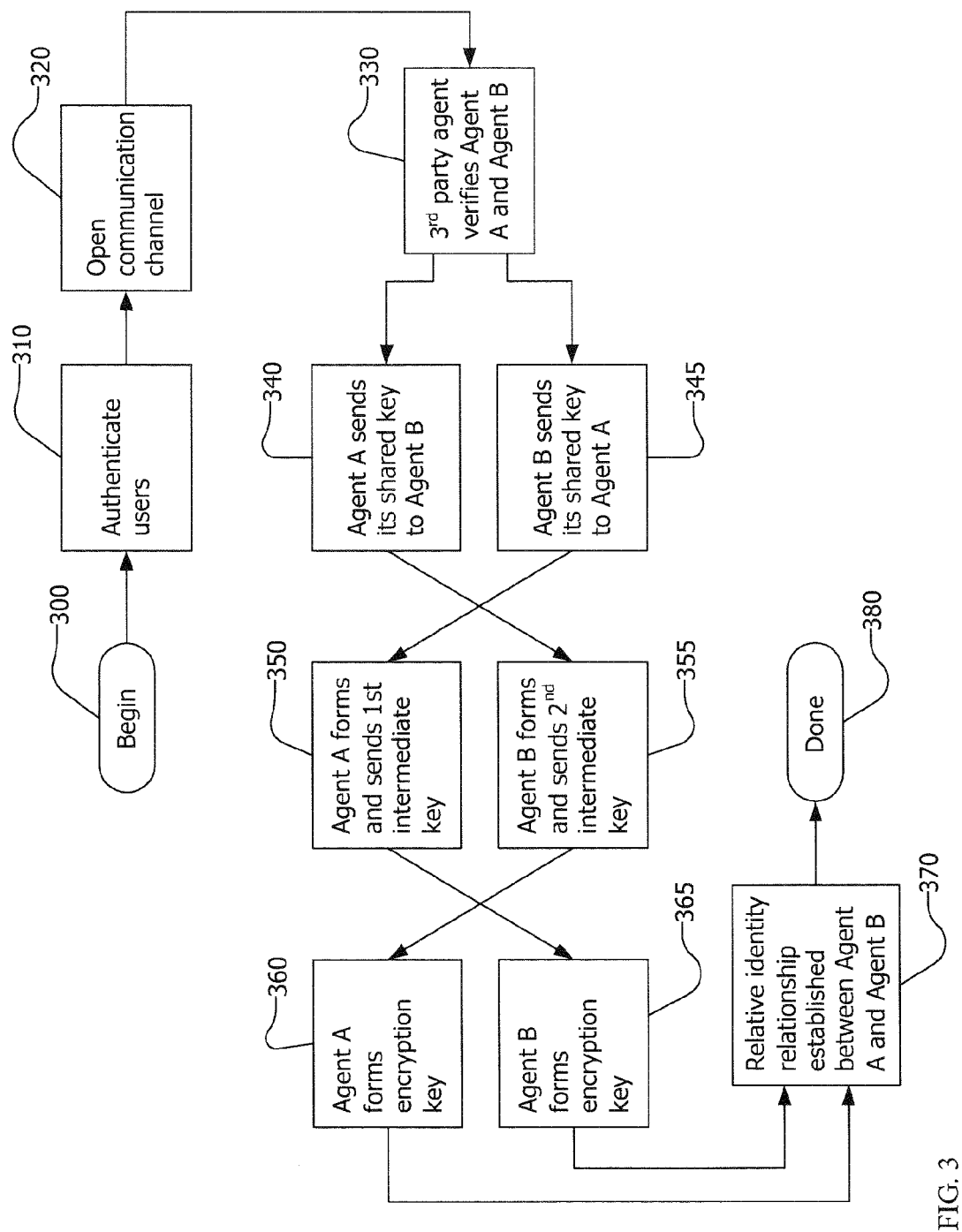
FIG. 3 is a flow chart of a process of establishing a relative identity relationship two agents.

FIG. 3 is a block diagram of another embodiment of a process to establish a relative identity relationship between two agents. The agents are again referred to as agent A and agent B. The process starts at 300 and ends at 380.

At 310, the agent A and agent B may be first authenticated to their respective computing devices. The agents may be authenticated to their respective computing devices in a number of ways, which may be the same or different for agent A and agent B. For example, when the local agent is under a user's control, the local agent may be authenticated using absolute identity information of the user. This could be, for example, a login ID and a password, and/or biometrics.

An agent may be authenticated to the computing device through relative identity. One technique for authenticating a user-controlled agent is to provide the computing device with an embedded master agent whose sole role is to interact with other agents installed in the computing device. Thus, for example, a user-controlled agent may authenticate itself to the embedded master agent based upon a relative identity between the user-controlled agent and the embedded master agent.

Either agent A or agent B may open a communication channel to the other agent at 320. At 330, a third party agent may optionally verify the identity of agent A and agent B and provide assurances to each agent of the identity of the other. The third party agent may be a specialized agent dedicated to verifying the identities of other agents on the network, or may be any agent that has established relative identity relationships with both agent A and agent B. The supervision of the third party agent is optional, and agent A and agent B may proceed to establish a relative identity relationship without third-party participation.

The process of FIG. 3 requires each agent to know or possess an absolute key and a partial relative key. Each agent's absolute key and the partial relative key may be obtained from an outside source (e.g., assigned to the agent) or may be generated within the agent. Keys may be generated using numerous techniques and algorithms. Agent A may acquire or generate a unique absolute key for each relationship between itself and other agents, including agent B. Agent A may have a single partial relative key used for all relationships, or may acquire or generate a unique partial relative key for each relationship with other agents. Similarly, agent B may have a unique absolute key for each relationship, and either a single partial relative key used for all relationships or a unique partial relative key for each relationship.

An agent's absolute key may not be transmitted or revealed to any other agent on the network. Not transmitting or revealing an agent's absolute key ensures that an agent's identity information cannot be stolen from transmission through the network since the identity information is not transmitted or revealed on the network. Since an agent has a unique absolute key for each relationship and the absolute keys are never transmitted or disclosed to other agents, each absolute key along with the partial relative key is equivalent to the relative identity of the agent for a specific relationship.

At 340 and 345, agents A and B exchange their respective partial relative keys. At 350, agent A forms a first intermediate key derived from agent A's absolute key and a function of the partial relative keys of both agent A and agent B. As previously described, the first intermediate key may be derived in numerous ways including using any of various algorithms or functions such as one-way hash functions, modulus functions, cyclic arithmetic operations, and various other algorithms. Similarly, at step 355, agent B forms a second intermediate key derived from its absolute key and a function of the partial relative keys of both agents. The first and second intermediate keys can be defined as follows:

$K_{I1}=f(a, q(c,d))$=first intermediate key, and
$K_{I2}=f(b, q(c,d))$=second intermediate key
where:
a=absolute key of agent A;
b=absolute key of agent B;
c=partial relative key of agent A;
d=partial relative key of agent B;
f and q are suitable functions or algorithms.

It should be recognized that the first and second intermediate keys of this example are distinct from each other. Additionally, both the first and second intermediate keys are derived, in part, from the partial relative keys of the local and remote agents and are thus unique to the relationship between these two agents. While both the first and second intermediate keys are derived, in part, from the absolute key of the agent that calculated the intermediate key, the absolute keys cannot be determined from the intermediate keys.

At step 360, agent A may form an encryption key $K_{AB}$ by combining agent A's absolute key with the second intermediate key received from agent B. The combination of agent A's absolute key with the second intermediate key may be done using the same function or algorithm used to form the intermediate keys. Similarly, at step 365, agent B may form an encryption key $K_{BA}$ by combining agent B's absolute key with the first intermediate key received from agent A. The combination of agent B's absolute key with the first intermediate key may be done using the same function or algorithm used to form the intermediate keys.

The function used to form the intermediate keys and the encryption keys may be an associative function, in which case the following relationship will hold:

$$K_{AB} = f[a, f(b, q(c, d))] = f[b, f(a, q(c, d))] = K_{BA}.$$

Thus both agent A and agent B may be in possession of an encryption key that may be used to encrypt subsequent communications between the agents. Moreover, since the encryption key can only be created through the use of the secret keys of both agents, the key cannot be recreated by either agent alone, or by any other party, even if the other party intercepts the partial relative keys and the intermediate keys during transmission between agent A and agent B. After the encryption key is formed, agents A and B may each discard the partial relative key and the intermediate key received from the other agent.

Figure 4:
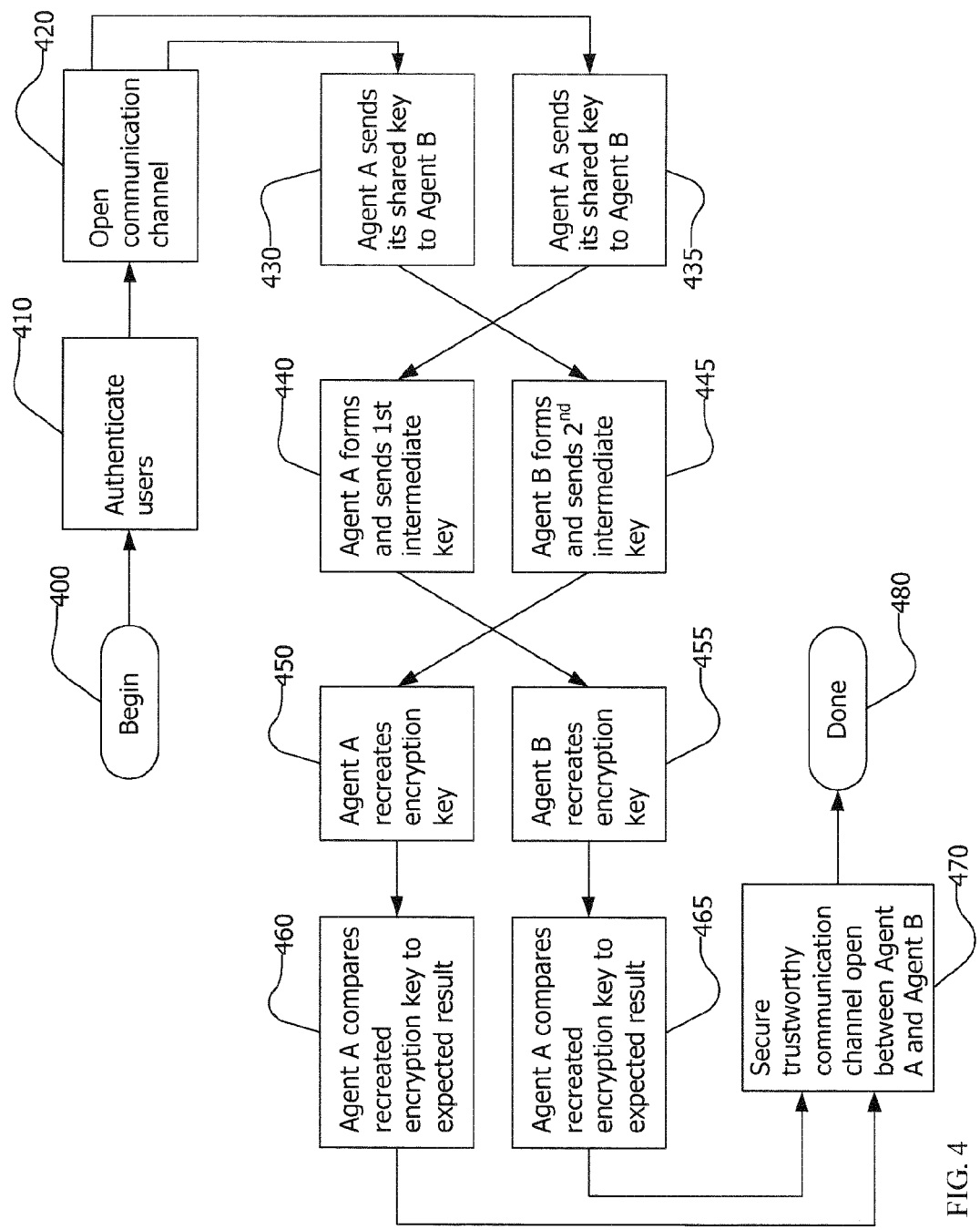
FIG. 4 is a flow chart of a process of establishing a secure trustworthy two-way cation channel between two agents having a relative identity relationship.

Agent A and agent B may then use the encryption key and their respective absolute and partial relative keys to authenticate one another at the start of subsequent communications. As shown in FIG. 4, an embodiment of a process for opening a secure trustworthy communication channel between agent A and agent B basically involves recreating the encryption key using information received from the other agent. The process for establishing a secure trustworthy communication channel starts at 400 and ends at 480. Optionally, the agents and users may be authenticated at 410 using the methods previously described in conjunction with act 310 in FIG. 3.

Either agent A or agent B may open a communication channel at 420. At 430 and 435, agent A and agent B exchange their respective partial relative keys. At 440 and 445, agent A forms and sends the first intermediate key, and agent B forms and sends the second intermediate key. The function or algorithm used to form the first and second intermediate keys may be the same as those employed when establishing the relative identity relationship between agent A and agent B (at 350 and 355 of FIG. 3). At 450 and 455, agent A and agent B recreate the encryption key. Recreating the encryption key may be performed using the function or process previously used when establishing the relative identity relationship between agent A and agent B (at 360 and 365 of FIG. 3).

At 460, agent A may compare the recreated encryption key from 450 with the known value of the encryption key. An exact match between the recreated and known encryption keys validates the identity of agent B to agent A. Similarly agent B may validate the identity of agent A at 465. A secure trustworthy communication channel may be opened between agent A and agent B at 470 only if both agents have successfully validated the identity of the other agent.

It must be noted that an impostor (e.g. Phisher) attempting to act as agent B must possess agent B's absolute and partial relative keys, as well as have knowledge of the functions or algorithms used to form the intermediate key and encryption key. In the optional situation where the communications between agent A and agent B are encrypted using the encryption key, the imposter would have to know the encryption key as well. Since the encryption key and the absolute key are never disclosed outside of the agent or transmitted over the network, the use of relative identity provides substantial protection against phishers and other impostors.

Steps described above may be performed consecutively or in parallel. Additional and fewer steps may be used to achieve the functionality described above. Furthermore, the process may be performed concurrently for multiple communication channels amongst numerous computing devices and agents.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for providing a secure trustworthy communication channel between a first agent operative on a first computing device connected to a network and a second agent operative on a second computing device connected to the network, the method comprising:
   a third computing device initially establishing a relative identity relationship between the first agent and the second agent including:
      defining a first relative identity for the first agent,
      defining a second relative identity for the second agent;
   wherein the first relative identity and second relative identity are both unique to the relationship between the first agent and the second agents, and there is a mathematical relationship between the first relative identity and the second relative identity;
   wherein a key for communicating between the first and second agent is generated based on the mathematical relationship by:

using a first intermediate key defined by a mathematical algorithm, function, or hash of an absolute key of the first agent, a partial relative key of the first agent, and a partial relative key of the second agent, using a second intermediate key defined by a mathematical algorithm, function, or hash of an absolute key of the second agent, the partial relative key of the first agent, and the partial relative key of the second agent, generating a first encryption key by using a mathematical algorithm, function or hash of the first intermediate key and the second absolute key of the second agent generating a second encryption key by using a mathematical algorithm, function, or hash of the second intermediate key and the first absolute key of the first agent wherein the first encryption key and the second encryption key are equivalent;

a fourth computing device verifying the first and second relative identities at the start of subsequent communication between the first and second agents;

wherein the third computing device is either the first computing device, the second computing device or another computing device;

wherein the fourth computing device is either the first computing device, the second computing device, the third computing device or another computing device;

wherein relative identity uniquely identifies one particular agent's relationship to another particular agent.

2. The method for providing a secure trustworthy communication channel of claim 1, wherein the first relative identity is not known to the second agent the second relative identity is not known to the first agent.

3. The method for providing a secure trustworthy communication channel of claim 2, wherein verifying the first and second relative identities additionally comprises the first agent sending the second agent first information derived, at least in part, from the first relative identity the second agent sending the first agent second information derived, at least in part, from the second relative identity the second agent using the first information to verify the relative identity of the first agent the first agent using the second information to verify the relative identity of the second agent.

4. The method for providing a secure trustworthy communication channel of claim 1, wherein initially establishing a relative identity relationship between the first agent and the second agent is supervised by a third agent, the third agent verifying the identities of the first agent and the second agent.

5. The method for providing a secure trustworthy communication channel of claim 1 wherein the method is executed on a banking application.

6. The method for providing a secure trustworthy communication channel of claim 1 wherein the first computing device is on a financial bank network.

7. The method for providing a secure trustworthy communication channel of claim 6 wherein the first agent has multiple relative identities for each of a plurality of bank customers.

8. A method for providing a secure trustworthy communication channel between a first agent on a first computing device connected to a network and a second agent on a second computing device connected to a network, the method comprising:

the first agent on the first computing device defining a first relative identity for the first agent with respect to the second agent;

the first agent on the first computing device sending first information derived, at least in part, from the first relative identity to the second agent;

the first agent on the first computing device receiving second information from the second agent wherein the second information is derived, at least in part, from a second relative identity of the second agent with respect to the first agent;

the first agent on the first computing device verifying the relative identity of the second agent using the second information;

wherein relative identity uniquely identifies one particular agent's relationship to another particular agent;

wherein there is a mathematical relationship between the first relative identity and the second relative identity;

wherein a key for communicating between the first and second agent is generated based on the mathematical relationship by:

using a first intermediate key defined by a mathematical algorithm, function, or hash of an absolute key of the first agent, a partial relative key of the first agent, and a partial relative key of the second agent, using a second intermediate key defined by a mathematical algorithm, function, or hash of an absolute key of the second agent, the partial relative key of the first agent, and the partial relative key of the second agent, generating a first encryption key by using a mathematical algorithm, function or hash of the first intermediate key and the second absolute key of the second agent generating a second encryption key by using a mathematical algorithm, function, or hash of the second intermediate key and the first absolute key of the first agent;

wherein the first encryption key and the second encryption key are equivalent.

9. A computing device for providing a secure trustworthy communication channel between a first agent on the computing device connected to a network and a second agent on a remote computing device connected to the network, the computing device comprising a processor a memory coupled with the processor a storage medium having instructions stored thereon which when executed cause the computing device to perform actions comprising defining a first relative identity for the first agent with respect to the second agent sending first information derived, at least in part, from the first relative identity to the second agent receiving second information from the second agent wherein the second information is derived, at least in part, from a second relative identity of the second agent with respect to the first agent verifying the second relative identity of the second agent using the second information wherein relative identity uniquely identifies one particular agent's relationship to another particular agent wherein there is a mathematical relationship between the first relative identity and the second relative identity wherein there is a mathematical relationship between the first relative identity and the second relative identity;

wherein a key for communicating between the first and second agent is generated based on the mathematical relationship by:
  using a first intermediate key defined by a mathematical algorithm, function, or hash of an absolute key of the first agent, a partial relative key of the first agent, and a partial relative key of the second agent,
  using a second intermediate key defined by a mathematical algorithm, function, or hash of an absolute key of the second agent, the partial relative key of the first agent, and the partial relative key of the second agent,
  generating a first encryption key by using a mathematical algorithm, function or hash of the first intermediate key and the second absolute key of the second agent,
  generating a second encryption key by using a mathematical algorithm, function, or hash of the second intermediate key and the first absolute key of the first agent;
wherein the first encryption key and the second encryption key are equivalent.

10. A non-transitory storage medium having instructions stored thereon which when executed by a processor will cause the processor to perform actions comprising
  defining a first relative identity for a first agent unique to a relationship between the first agent and a second agent wherein the first agent is located on a first computing device and the second agent is located on a second computing device
  sending first information derived, at least in part, from the first relative identity to the second agent
  receiving second information from the second agent wherein the second information is derived, at least in part, from a second relative identity of the second agent with respect to the first agent
  verifying the second relative identity of the second agent using the second information
wherein relative identity uniquely identifies one particular agent's relationship to another particular agent
wherein there is a mathematical relationship between the first relative identity and the second relative identity
wherein there is a mathematical relationship between the first relative identity and the second relative identity;
wherein a key for communicating between the first and second agent is generated based on the mathematical relationship by:
  using a first intermediate key defined by a mathematical algorithm, function, or hash of an absolute key of the first agent, a partial relative key of the first agent, and a partial relative key of the second agent,
  using a second intermediate key defined by a mathematical algorithm, function, or hash of an absolute key of the second agent, the partial relative key of the first agent, and the partial relative key of the second agent,
  generating a first encryption key by using a mathematical algorithm, function or hash of the first intermediate key and the second absolute key of the second agent,
  generating a second encryption key by using a mathematical algorithm, function, or hash of the second intermediate key and the first absolute key of the first agent;
wherein the first encryption key and the second encryption key are equivalent.

* * * * *